United States Patent [19]

Reger et al.

[11] Patent Number: 5,513,536
[45] Date of Patent: May 7, 1996

[54] PRESSURE, FORCE AND TORQUE MEASURING DEVICE

[75] Inventors: Herbert Reger, Sachsenheim; Rudolf Heinz, Renningen; Rainer Martin, Heidenheim; Manfred Moser, Reutlingen; Hans Braun, Stuttgart, all of Germany

[73] Assignee: Robert Bosch GmbH, Stuttgart-Feuerbach, Germany

[21] Appl. No.: 328,689

[22] Filed: Oct. 25, 1994

[30] Foreign Application Priority Data

Oct. 28, 1993 [DE] Germany ............... 43 36 773.9

[51] Int. Cl.⁶ ................................................. G01L 3/00
[52] U.S. Cl. ............... 73/862.191; 73/814; 73/847; 73/862.322; 73/862.325
[58] Field of Search ..................... 73/819, 824, 814, 73/847, 852, 781, 774, 776, 777, 862.321, 862.322, 862.191, 862.325, 862.338

[56] References Cited

U.S. PATENT DOCUMENTS

| | | | |
|---|---|---|---|
| 2,423,620 | 7/1947 | Ruge | 73/862.338 |
| 3,614,488 | 10/1971 | Sonderegger et al. | 73/774 |
| 4,297,877 | 11/1981 | Stahl | 73/862.338 |
| 4,312,241 | 1/1982 | Budraitis | 73/862.338 |
| 4,552,024 | 11/1985 | Baker et al. | 73/852 |
| 4,723,450 | 2/1988 | Coulter | 73/862.191 |
| 4,724,711 | 2/1988 | Sakakibura et al. | 73/862.338 |
| 4,754,652 | 7/1988 | Coulter et al. | 73/862.191 |
| 4,800,764 | 1/1989 | Brown | 73/862.322 |
| 4,979,397 | 12/1990 | Kronberg | 73/862.191 |
| 5,327,790 | 7/1994 | Levin et al. | 73/862.321 |

FOREIGN PATENT DOCUMENTS

| | | | |
|---|---|---|---|
| 1275306A | 8/1968 | Germany | 73/862.321 |
| 1952522 | 11/1970 | Germany. | |
| 3623391A1 | 1/1988 | Germany. | |
| 3818191 | 10/1991 | Germany. | |
| 680689A5 | 10/1992 | Switzerland. | |
| 0462107 | 7/1975 | U.S.S.R. | 73/814 |
| 0913107 | 3/1982 | U.S.S.R. | 73/814 |
| 2096777 | 10/1982 | United Kingdom. | |

Primary Examiner—Richard Chilcot
Assistant Examiner—George M. Dombroske
Attorney, Agent, or Firm—Spencer & Frank

[57] ABSTRACT

A device for measuring a force, a pressure or a torque transmitted in a force path between first and second apparatus components, includes at least three mutually spaced piezo-resistive resistor elements disposed in the force path between the first and second apparatus components such that the apparatus components orthogonally stress the resistor elements.

15 Claims, 4 Drawing Sheets

PRESSURE, FORCE AND TORQUE MEASURING DEVICE

CROSS REFERENCE TO RELATED APPLICATION

This application claims the priority of German Application No. P 43 36 773.9 filed Oct. 28, 1993, which is incorporated herein by reference.

BACKGROUND OF THE INVENTION

This invention relates to a device for measuring pressures, forces and torques and has at least three piezo-resistive resistor elements which are mechanically stressed by apparatus components and which take up forces and torques transmitted by the apparatus components.

In a known device of the above-outlined type, as disclosed, for example, in German Offenlegungsschrift (application published without examination) 36 23 391, a plurality of resistor elements are mounted on a spring disk which pivotally couples a driving unit of a handling apparatus with a tool holder. The spring disk which is secured at its edge to the drive unit and at its middle to the tool holder is deformed in response to external forces applied to the tool holder by the tool. During this occurrence the resistor elements too, undergo a deformation, resulting in a resistance signal. In such an arrangement the measuring results depend from the bias (pre-tension) and the material properties of the spring disk. These, in turn, are affected by the temperature and also by the fatigue of material after a certain service period. Also, the prior art arrangement is not adapted to measure torques because the spring disk clamped at its edge and in the middle connects the apparatus components rigidly to one another and deforms insufficiently during transmission of torques.

U.K. Published Application 2,096,777 discloses a device of the earlier-outlined type for measuring forces and torques in the x, y and z directions. According to this reference, the resistor elements are supported on the side faces of four uniformly distributed arms which couple a hub associated with one apparatus component to an outer ring associated with the other apparatus component. The joints of the arms with the outer ring are weakened in such a manner that upon appearance of a force or a torque in an axis extending through one arm pair, essentially only the other, transversely arranged arm pair is deformed, resulting in a simplification of the evaluation circuitry. In this arrangement too, the measuring results are dependent from the properties of the material of the parts which carry the measuring elements. Further, the measuring elements change their resistance only relatively slightly in case of alternating stresses.

Further, pressure measuring devices are known as disclosed, for example, in German Patent No. 3,818,191, which are provided with a single piezo-resistive resistor element orthogonally stressed by a plunger to which the pressure to be measured is applied. These devices, however, are not adapted to measure bending or rotary torques.

SUMMARY OF THE INVENTION

It is an object of the invention to provide an improved measuring device of the above-outlined type from which the discussed disadvantages are eliminated.

This object and others to become apparent as the specification progresses, are accomplished by the invention, according to which, briefly stated, the device for measuring a force, a pressure or a torque transmitted in a force path between first and second apparatus components, includes at least three mutually spaced piezo-resistive resistor elements disposed in the force path between the first and second apparatus components such that the apparatus components orthogonally stress the resistor elements.

The device according to the invention has the advantage that the measuring results are largely independent from the material properties of the apparatus components which stress the resistor elements, and a deforming body may be omitted altogether. Torques too, generate individual forces which stress orthogonally the resistance layer and its substrate so that at all times the measuring process is performed essentially without displacement of parts.

According to a further advantageous feature of the invention, the resistor elements are held orthogonally biased between the adjoining apparatus components and the magnitude of the bias is so selected that in all operational conditions a minimum bias is maintained for all resistor elements. This yields a linear signal course for the resistor elements throughout the entire operational range and furthermore, the resistor elements may be held and contacted in their carriers without being affixed thereto, so that they may be easily replaced if needed.

According to a further feature of the invention, the resistor elements are arranged in pairs axially opposite one another on the two end faces of a carrier part which extends in a plane oriented perpendicularly to the flow of force and which is associated with the one apparatus component. Further, the other apparatus component is coupled with axial abutment faces to the carrier part for ensuring a biased condition of the resistor elements. In this arrangement the resistor elements are fully participating in the flow of force to be measured and thus a parallel force coupling with other parts cannot occur. Further, the evaluation of the signals is performed by forming a signal difference between two axially opposite resistor elements, whereby the effect of the environmental temperature on the measuring signal is eliminated.

In a further advantageous embodiment of the invention, a carrier part representing one apparatus component, has at least three carrier arms extending radially outwardly from its axis of symmetry. At the end of the arms resistor elements are arranged such that they face each other in pairs as viewed axially and circumferentially. The other apparatus component has axially and circumferentially aligned abutment faces contacting the resistor elements with a bias. In addition to pressures, forces and bending or tilting torques this embodiment may measure rotary torques as well. In each instance, the resistor elements are stressed by individual forces in an orthogonal direction and are fully participating in the transmission of force and torque.

The axial and, occasionally, the radial abutment faces may be formed by balls which are held in a housing cage connected with the corresponding apparatus component and are urged against the resistor elements by setting screws supported in the housing cage.

For increasing the mechanical load capacity of the resistor elements, according to a further feature of the invention, the resistor elements have a metal (preferably steel) substrate which is coated with an insulating layer, particularly an insulating glass layer which, in turn, carries a thick-film resistor (applied with a screen printing process). In case a simple and fast replacement of the resistor elements is not needed, the metal substrate may be formed as a one-piece component with the carrier part. A preferably metal upper part may cover the thin-film resistor and may be secured thereto by a glass or adhesive layer. In some instances it may be expedient to omit the upper part and contact the thin-film resistor by a force-transmitting plunger with the interposition of a glass or an adhesive layer.

For purposes of temperature compensation it may be advantageous to dispose an unstressed complemental resistor on the metal substrate of one of the resistor elements and to connect the same in a half-bridge circuit with the stressed thick-film resistor.

DESCRIPTION OF THE PREFERRED EMBODIMENTS

Figure 1:
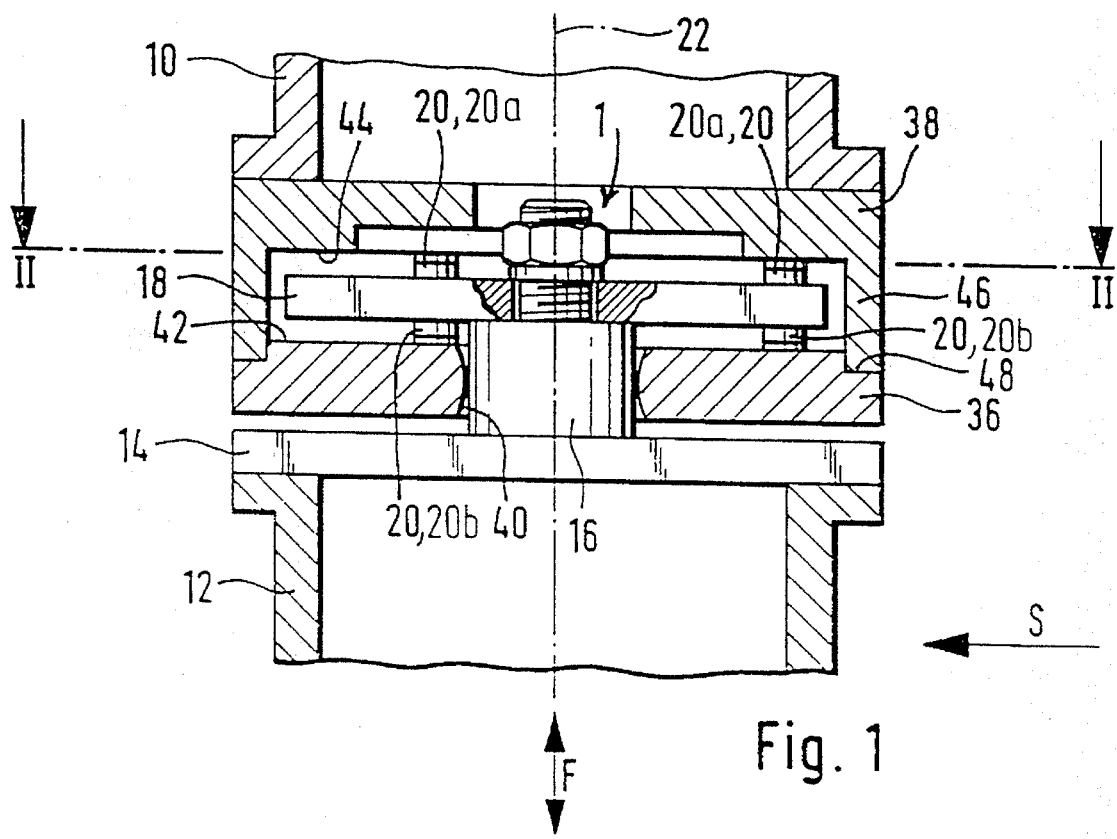
FIG. 1 is an axial sectional view of a first embodiment of the invention, illustrating parts of a handling apparatus, including a device for measuring axial forces and bending torques.
Figure 2:
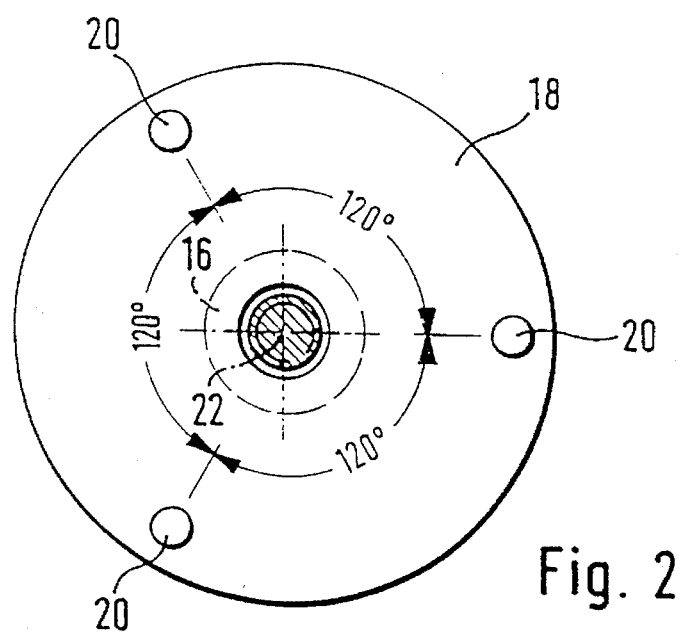
FIG. 2 is a sectional view along line II—II of some of the components of the structure shown in FIG. 1.

Turning to FIGS. 1 and 2, the measuring device generally designated at 1 is disposed between an arm portion 10 of a handling apparatus and a tool holder 12 jointed to the arm apparatus 10, for measuring forces applied to the tool holder 12, namely axial forces F, lateral forces S as well as tilting torques generated thereby. The tool holder 12 is fixedly secured to an adaptor plate 14 which has a centrally mounted support post 16 carrying at its top a releasably secured carrier plate 18. On the upper and lower radial faces of the carrier plate 18 three piezo-resistive resistor elements 20 are arranged in a position aligned parallel with the symmetry axis 22 of the apparatus components 10, 12. The resistor elements 20 have identical radial distances from the axis 22 and are spaced in a uniform distribution thereabout.

Figure 3:
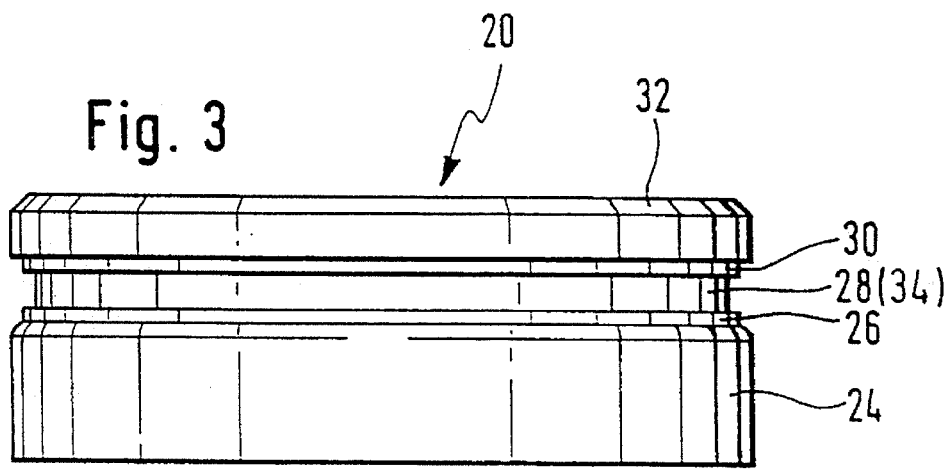
FIG. 3 is an enlarged side elevational view of a resistor element structured according to the invention.
Figure 4:
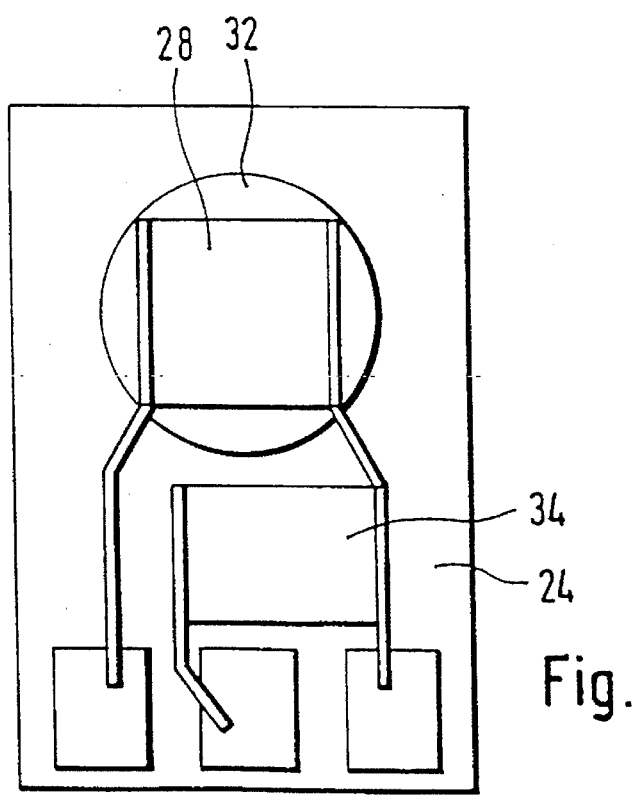
FIG. 4 is a top plan view of a half-bridge circuit of a stressed thick-film resistor and a non-stressed complementary resistor arranged on a common substrate.

FIG. 3 illustrates the structure of one resistor element 20. Thus, the resistor element 20 has a metal (preferably steel) substrate 24, which, on one face, is coated with a glass insulating layer 26 to which a piezo-resistive thick-film resistor 28 is applied by a screen printing process. The thick-film resistor 28 is connected by means of a glass or adhesive layer 30 with an upper part 32 which preferably is also of metal. The contacting of the thick-film resistor 28 may occur in a manner which is conventional in the thick-film technology; such contact structure therefore need not be described in any further detail. For the purpose of temperature compensation of the resistance values, on the substrate 24 a non-stressed complementary resistor 34 may be printed (FIG. 4) which is connected with the thick-film resistor 28 by means of a half-bridge circuit (FIG. 7).

The arm portion 10 of the apparatus is connected with a housing cage which is formed of two mutually centered housing parts 36 and 38. The housing part 36 which is shown to be the lower housing portion in FIG. 1 has a receiving bore 40 through which the post 16 passes and which has a convex bore wall configuration to allow a rocking motion of the post 16 with respect to the housing part 36. Further, the housing part 36 is provided with a planar abutment face 42 for contacting the resistor elements 20 which are mounted on the underside of the carrier plate 18. The upper housing part 38 accommodates the carrier plate 18 with an all-around clearance and has a planar abutment face 44 for contacting the resistor elements 20 which are mounted on the upper face of the carrier plate 18.

The two housing parts 36 and 38 are tightened to one another by non-illustrated means such that a radial outer face of a circumferential skirt 46 forming part of the housing part 38 engages an annular shoulder 48 of the housing part 36 and the two housing parts 36, 38 are in a coaxial relationship with one another. The axial dimensions of the housing portions are so selected that both in the position of rest and under any loads on the apparatus components 10 and 12, all six resistor elements 20 are at least under a weak stress. This ensures that a linear signal course will be obtained at all the resistor elements 20 and further, the resistor elements 20 need not be fixedly connected with the components which carry them but need only be held thereon in a centered manner.

Figure 6:
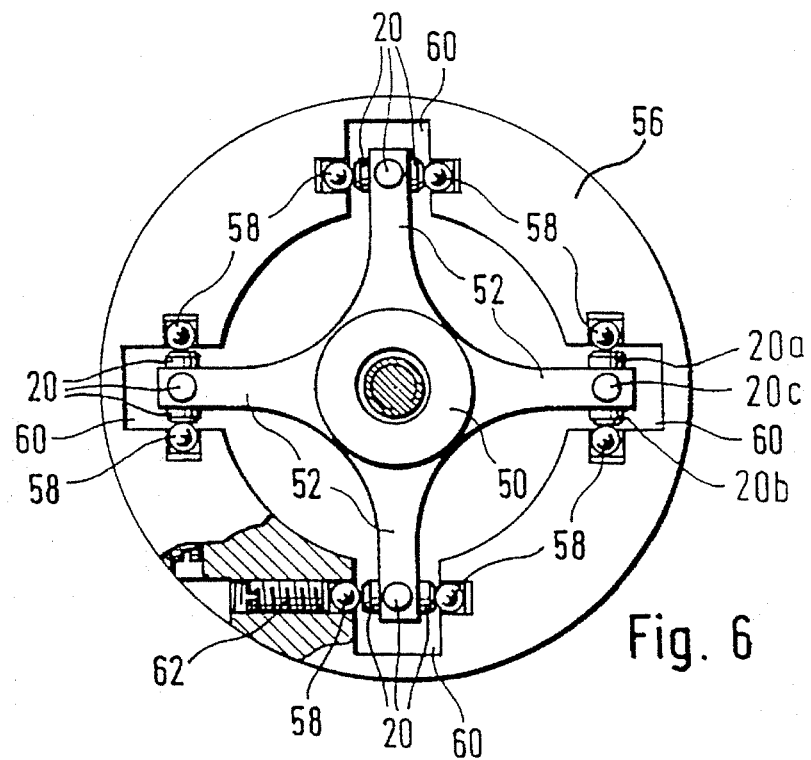
FIG. 6 is a sectional view along line VI—VI of some of the components of the structure shown in FIG. 5.
Figure 7:
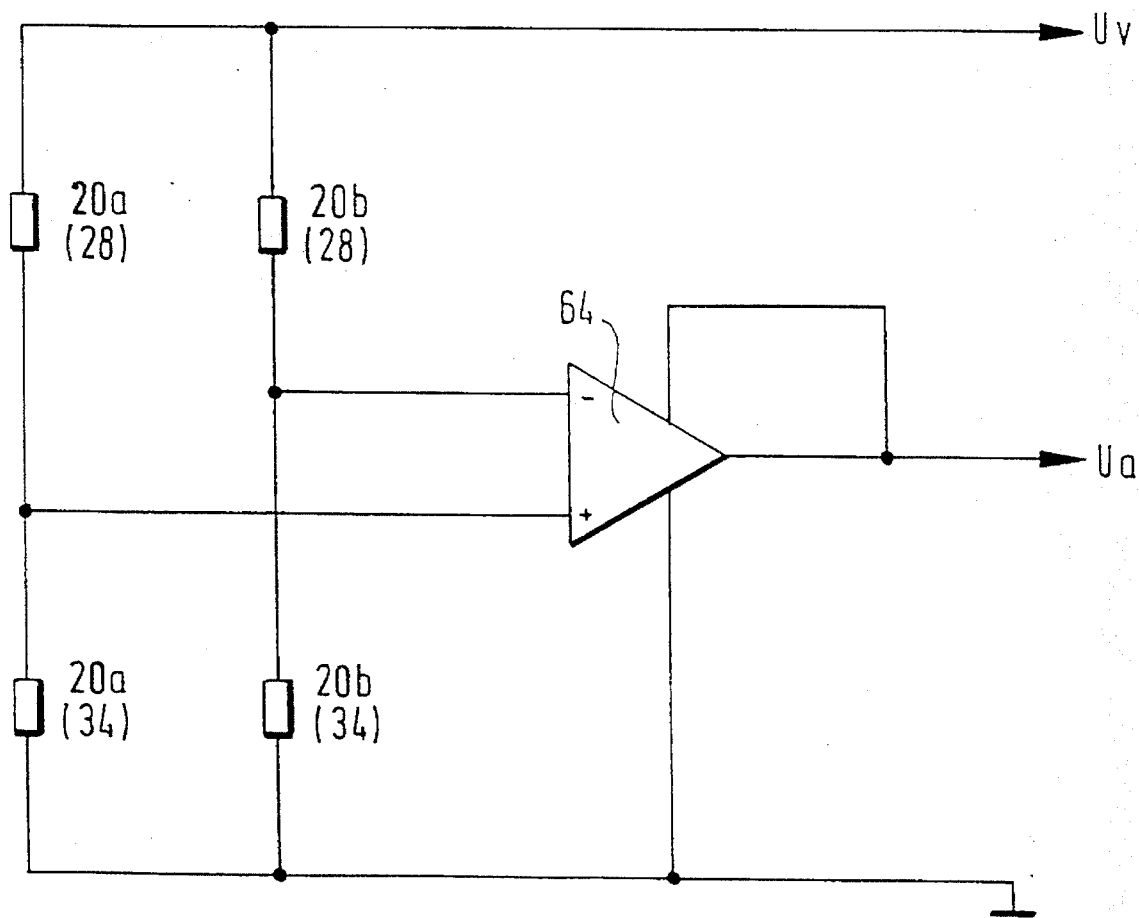
FIG. 7 is a diagram of a bridge circuit for generating a measuring signal with a device structured according to the invention.

The resistor elements 20 are, as shown in FIG. 7, connected in an evaluating circuit for combining the signals emitted by the individual resistor elements 20. The evaluating circuit is at least in part mounted on the carrier plate 18. In each instance, the oppositely located resistor elements $20a$ and $20b$ or $20c$ and $20d$ (28 and 34, respectively, as indicated in parenthesis in FIG. 7) are connected to form a half bridge, and the inputs of an instrument amplifier (for example, a Burr-Brown PGA 204 model) are connected to the diagonal points of the bridge. The output voltage $U_A$ of the amplifier 64 represents the measuring voltage, whereas $U_v$ designates the d.c. supply voltage of the bridge circuit. The amplifier 64 is required for readying a sufficient measuring voltage because, as a rule, the voltage difference in the bridge diagonal amounts only to a few millivolts (mV). In the circuit arrangement according to FIG. 7, the "ratiometric evaluation principle" is used where the output voltage $U_a$ relates to the supply d.c. voltage $U_v$. The measuring resistor $20d$ is not seen in FIG. 6 since it is hidden behind the measuring resistor $20c$. The circuit shown in FIG. 7 may be used with the structures shown in FIGS. 5 and 6. Upon appearance of lateral forces S (FIG. 1), the three resistance element pairs 20 are stressed or relieved to a different extent. As a result, the evaluating circuit senses the lateral force or bending moment according to magnitude and direction. By evaluating the differential signals of the coaxial, diametrically oppositely located resistor elements 20, a temperature compensation of the resistor signals is also obtained.

Figure 5:
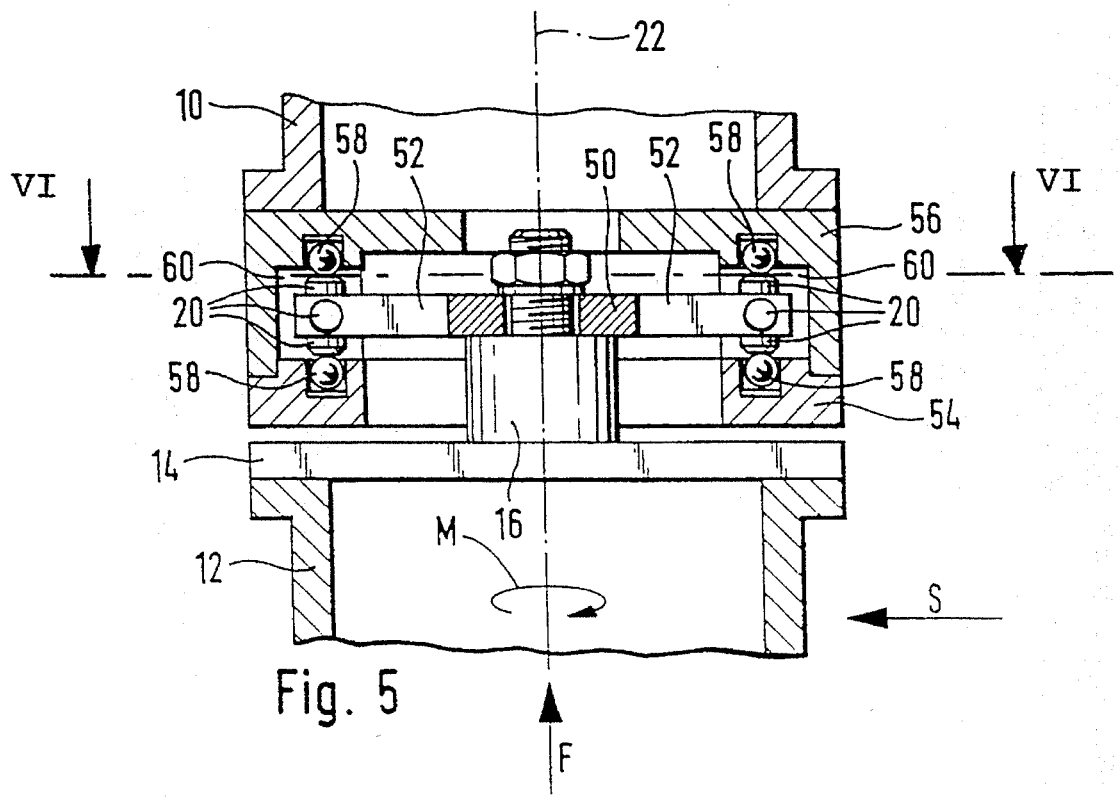
FIG. 5 is an axial sectional view of a second preferred embodiment of the invention.

Turning to FIGS. 5 and 6, by means of the expanded measuring device shown therein, axial forces F, lateral forces S, tilting torques as well as a rotary torque M generated thereby about the symmetry axis 22 are sensed. The device is, similarly to the first-described embodiment of FIGS. 1 and 2, arranged between an arm portion 10 of a handling apparatus and a tool holder 12 to which an adaptor plate 14 is secured. On the post 16 mounted on the adaptor plate 14 there is releasably mounted a cross-shaped component 50 formed of four arms 52 arranged at right angles to one another. At the free ends of each arm 52, similarly to the first described embodiment, a respective resistor element 20 is secured at the top and the underside such that the resistor elements are in axial alignment. In addition, each arm 52 carries two additional, axially aligned resistor elements 20 oriented in opposite circumferential directions.

The arm portion 10 is connected with a housing cage which is formed of two housing parts 54 and 56. In both housing parts 54 and 56 balls 58 or other, differently shaped contact elements, for example, frustocones, are provided which are held in corresponding recesses of the housing parts and which have engagement or pressure faces for the resistor elements 20. The two housing parts 54, 56 are, similarly to the first-described embodiment, axially tightened to one another such that the resistor elements 20 oriented in the axial direction have the desired bias.

The balls 58 provided for contacting the circumferentially arranged resistor elements 20 are supported in the upper housing part 56 which is provided with inner wall recesses 60 for receiving the free ends of the arms 52. The balls 58 are, as shown in FIG. 6, pressed against the resistor elements 20 by setscrews 62 which are threadedly engaged in threaded bores of the housing part 56. By appropriately configuring the housing part 56, the axially effective balls 58 too, may be individually pressed by setscrews 62 with a predetermined bias against the resistor elements 20 mounted at the top and at the underside of the rotary cross 50. In any event, the resistor elements are stressed solely with orthogonal forces so that a substantially displacement-free measurement of forces and torques in all directions may be achieved. In a slightly simplified, non-illustrated embodiment, instead of a component in the shape of a cross with four arms and sixteen resistor elements, it is feasible to provide only three arms and a total of twelve resistor elements.

In both embodiments it is feasible to attach the resistor elements to the carrier parts, for example, by inserting them in fitting depressions without affixation, so that, if needed, the resistor elements may be readily replaced.

It is also feasible to so modify the embodiment illustrated in FIGS. 5 and 6 that the resistor elements 20 are loosely received in the recesses (sockets) of the housing cage 54, 56 and the balls 58 are secured to the ends of the arms 52. In such a modification the setscrews 62 press the respective resistor elements 20 in the sockets against the respective balls 58 carried by the arms 52 of the cross-shaped component 50.

It will be understood that the above description of the present invention is susceptible to various modifications, changes and adaptations, and the same are intended to be comprehended within the meaning and range of equivalents of the appended claims.

What is claimed is:

1. In an apparatus including a first and a second apparatus component disposed adjacent one another and a measuring device for measuring a force, a pressure or a torque transmitted in a force path between the first and second apparatus components, the improvement comprising at least three mutually spaced thick-film piezo-resistive resistor elements disposed in said force path between said first and second apparatus components such as to be exposed to orthogonal stresses from said first and second apparatus components; means for maintaining an orthogonal bias by said first and second apparatus components on each said resistor element; said orthogonal bias being of such a magnitude that a minimum bias is maintained for all said resistor elements at all times.

2. The apparatus as defined in claim 1, wherein said first apparatus component has a central axis; said force path being generally codirectional with said central axis; further comprising a carrier secured to said first apparatus component and having opposite first and second end faces oriented perpendicularly to said axis; said carrier extending in a plane generally perpendicular to said axis; further wherein said resistor elements are mounted on said first and second end faces in pairs such that a first resistor element of any one pair is mounted on said first end face and a second resistor element of said one pair is mounted on said second end face in axial alignment with said first resistor element; said second apparatus component having oppositely located abutment faces being in a biased contact with the first and second resistor elements of each said pair.

3. The apparatus as defined in claim 2, further comprising a housing cage affixed to said second apparatus component; said carrier and said resistor elements being accommodated in said housing cage; balls supported in said housing cage; said abutment faces constituting surface portions of said balls.

4. The apparatus as defined in claim 3, further comprising set screws held in said housing cage for urging said balls against respective said resistor elements.

5. The apparatus as defined in claim 1, wherein said first apparatus component has a central axis; said force path being generally codirectional with said central axis; further comprising a carrier secured to said first apparatus component; said carrier including at least three carrier arms extending radially from said central axis and having outer ends; further wherein said resistor elements are secured in first and second pairs to the outer end of each said carrier arm; the two resistor elements of the first pair at each said outer end being in axial alignment with one another and the two resistor elements of the second pair at each said outer end being in circumferential alignment with one another; said second apparatus component having oppositely located radial and axial abutment faces being in a biased contact with the two resistor elements of each said pair at the outer end of each said carrier arm.

6. The apparatus as defined in claim 5, further comprising a housing cage affixed to said second apparatus component; said carrier and said resistor elements being accommodated in said housing cage; balls supported in housing said cage; said radial and axial abutment faces constituting surface portions of said balls.

7. The apparatus as defined in claim 6, further comprising set screws held in said housing cage for urging said balls against respective said resistor elements.

8. The apparatus as defined in claim 1, wherein said first apparatus component has a central axis; said force path being generally codirectional with said central axis; further comprising a housing cage affixed to said second apparatus component; said housing cage having a plurality of sockets arranged in first and second pairs; the sockets of each first pair being in axial alignment with one another and the sockets of each second pair being in circumferential alignment with one another; each said socket loosely receiving a separate said resistor element; further comprising a carrier secured to said first apparatus component; said carrier including at least three carrier arms extending radially from said central axis and having outer ends; further comprising balls secured in first and second pairs to the outer end of each said carrier arm; the two balls of the first pair at each said outer end being in axial alignment with one another and the two balls of the second pair at each said outer end being in circumferential alignment with one another; each said ball being in alignment with a separate one of said resistor elements; further comprising tightening means situated in each said socket for pressing respective said resistor elements against respective said balls.

9. The apparatus as defined in claim 1, wherein each said resistor element comprises a metal substrate, an insulating layer carried on said substrate and a screen-printed thick-film resistor carried on said insulating layer.

10. The apparatus as defined in claim 9, further comprising a cover part mounted on said thick-film resistor and being bonded thereto by one of glass and adhesive layer.

11. The apparatus as defined in claim 10, wherein said cover part is metal.

12. The apparatus as defined in claim 9, wherein said substrate is a steel substrate.

13. The apparatus as defined in claim 9, further comprising a non-biased complemental resistor mounted on said substrate and a half-bridge circuit connecting said thick-film resistor with said complemental resistor.

14. The apparatus as defined in claim 9, wherein said insulating layer is a glass layer.

15. An apparatus comprising a first and a second apparatus component disposed adjacent one another along an axis and a measuring device for measuring a force oriented parallel to said axis and being transmitted in a force path between the first and second apparatus components; at least three mutually spaced thick-film piezo-resistive resistor elements disposed in said force path between said first and second apparatus components such as to be exposed to orthogonal stresses from said first and second apparatus components; means for maintaining an orthogonal bias by said first and second apparatus components on each said resistor element; said orthogonal bias being of such a magnitude that a minimum bias is maintained for all said resistor elements at all times.

* * * * *